(12) United States Patent
Gupta

(10) Patent No.: US 9,029,300 B2
(45) Date of Patent: May 12, 2015

(54) COMPOSITES FOR CONTROLLED RELEASE OF WELL TREATMENT AGENTS

(75) Inventor: D. V. Satyanarayana Gupta, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 739 days.

(21) Appl. No.: 13/094,186

(22) Filed: Apr. 26, 2011

(65) Prior Publication Data

US 2012/0273197 A1 Nov. 1, 2012

(51) Int. Cl.
C09K 8/80 (2006.01)
E21B 43/10 (2006.01)
C09K 8/536 (2006.01)
C04B 38/00 (2006.01)
C09K 8/54 (2006.01)
C04B 40/06 (2006.01)

(52) U.S. Cl.
CPC .............. C09K 8/536 (2013.01); C04B 38/009 (2013.01); C09K 8/54 (2013.01); C09K 8/805 (2013.01); C04B 40/0641 (2013.01)

(58) Field of Classification Search
None
See application file for complete search history.

(56) References Cited

U.S. PATENT DOCUMENTS

| 4,013,587 | A | 3/1977 | Fischer et al. |
| 4,390,456 | A | 6/1983 | Sanchez et al. |
| 5,964,291 | A | 10/1999 | Bourne et al. |
| 7,426,961 | B2 | 9/2008 | Stephenson et al. |
| 7,459,209 | B2 * | 12/2008 | Smith et al. .................... 428/403 |
| 7,491,682 | B2 | 2/2009 | Gupta et al. |
| 7,493,955 | B2 | 2/2009 | Gupta et al. |
| 7,598,209 | B2 | 10/2009 | Kaufman et al. |
| 7,686,081 | B1 | 3/2010 | Becker |
| 2002/0128157 | A1 | 9/2002 | Bates et al. |
| 2004/0060702 | A1 | 4/2004 | Kotlar et al. |
| 2004/0074646 | A1 | 4/2004 | Kotlar et al. |
| 2005/0022991 | A1 | 2/2005 | Rao |
| 2005/0028976 | A1 | 2/2005 | Nguyen et al. |
| 2005/0034868 | A1 | 2/2005 | Frost et al. |
| 2006/0065396 | A1 | 3/2006 | Dawson et al. |
| 2007/0036977 | A1 * | 2/2007 | Sinclair et al. ............... 428/403 |
| 2007/0173417 | A1 | 7/2007 | Kaufman et al. |
| 2007/0202318 | A1 * | 8/2007 | Smith et al. .................... 428/323 |
| 2008/0053657 | A1 * | 3/2008 | Alary et al. ................ 166/280.2 |
| 2008/0058229 | A1 | 3/2008 | Berkland et al. |
| 2008/0078547 | A1 * | 4/2008 | Sinclair et al. ................ 166/278 |
| 2008/0182765 | A1 * | 7/2008 | Pershikova et al. ........... 507/271 |
| 2008/0217012 | A1 | 9/2008 | Delorey et al. |
| 2008/0287324 | A1 | 11/2008 | Pursley et al. |
| 2009/0114247 | A1 | 5/2009 | Brown et al. |
| 2009/0131285 | A1 | 5/2009 | Wang et al. |
| 2009/0308610 | A1 * | 12/2009 | Windebank et al. ....... 166/280.2 |
| 2009/0325825 | A1 | 12/2009 | Gupta et al. |
| 2010/0059224 | A1 | 3/2010 | Palamara et al. |
| 2010/0175875 | A1 | 7/2010 | Becker et al. |

(Continued)

FOREIGN PATENT DOCUMENTS

WO WO2006129258 12/2006

Primary Examiner — John J Figueroa
(74) Attorney, Agent, or Firm — John Wilson Jones; Jones & Smith, LLP

(57) ABSTRACT

A well treatment composite which allows for the slow release of one or more well treatment agents into a subterranean formation and/or a wellbore penetrating the formation has a nano-sized calcined porous substrate (adsorbent) of high surface area onto which is applied the well treatment agent. The composites are suitable for use in such well treatment operations as hydraulic fracturing and sand control.

19 Claims, 3 Drawing Sheets

(56) References Cited

U.S. PATENT DOCUMENTS

2012/0012326 A1 1/2012 Darby et al.
2012/0252706 A1 10/2012 Steiner
2012/0318515 A1 12/2012 Cawiezel et al.

* cited by examiner

COMPOSITES FOR CONTROLLED RELEASE OF WELL TREATMENT AGENTS

FIELD OF THE INVENTION

Composites containing at least one well treatment agent and a calcined porous metal oxide may be used in well treatment operations in order to slowly release the well treatment into the surrounding environment.

BACKGROUND OF THE INVENTION

Fluids produced from wells typically contain a complex mixture of components including aliphatic hydrocarbons, aromatics, hetero-atomic molecules, anionic and cationic salts, acids, sands, silts and clays. The nature of these fluids combined with the severe conditions of heat, pressure, and turbulence to which they are often subjected, are contributory factors to scale formation, salt formation, paraffin deposition, emulsification (both water-in-oil and oil-in-water), gas hydrate formation, corrosion, asphaltene precipitation and paraffin formation in oil and/or gas production wells and surface equipment. Such conditions, in turn, decrease permeability of the subterranean formation and thus reduce well productivity. In addition, such conditions shorten the lifetime of production equipment. In order to clean deposits from wells and equipment it is necessary to stop the production which is both time-consuming and costly.

Well treatment agents are often used in production wells to prevent the deleterious effects caused by such deposits and precipitates. For instance, scaling in the formation (as well as in production lines downhole) is often controlled by the use of scale inhibitors.

Several methods are known in the art for introducing well treatment agents into production wells. For instance, a liquid well treatment agent may be forced into the formation by application of hydraulic pressure from the surface which forces the treatment agent into the targeted zone. In most cases, such treatments are performed at downhole injection pressures below that of the formation fracture pressure. Alternatively, the delivery method may consist of placing a solid well treatment agent into the producing formation in conjunction with a hydraulic fracturing operation. This method is often preferred because it puts the treatment agent in contact with the fluids contained in the formation before such fluids enter the wellbore where deleterious effects are commonly encountered.

A principal disadvantage of such methods is the difficulty in releasing the well treatment agent into the well over a sustained period of time. As a result, treatments must repeatedly be undertaken to ensure that the requisite level of treatment agent is continuously present in the well. Such treatments result in lost production revenue due to down time.

Treatment methods have therefore been sought for introducing well treatment agents into oil and/or gas wells wherein the treatment agent may be released over a sustained period of time and wherein continuous attention of operators over prolonged periods is unnecessary.

U.S. Pat. Nos. 7,491,682 and 7,493,955 disclose methods of treating a well by use of a composite containing a well treatment agent adsorbed onto high surface area solid carrier materials. Such composites may be used for the slow release of well treatment agents into the formation and the environs. They have been used in various formations including deepwater, tight gas and coal bed methane formations. U.S. Pat. No. 7,686,081 and U.S. Patent Publication No. 2010/0175875 disclose recharging such particles once they are depleted.

Such composites, however, often have an inherent drawback in that they do not exhibit the requisite strength of proppants and thus must usually be mixed at less than 10% by weight of the proppant in the fracture or sand control treatment. Higher loadings result in crushing of the composites translating into a loss of pack conductivity.

There is a need therefore for the development of well treatment composites that exhibit the strength of a proppant and yet are characterized by a high surface area in order that loading of the composite in a proppant pack may be increased.

SUMMARY OF THE INVENTION

A well treatment composite may be used in stimulation of a well by being introduced into a subterranean formation or into the wellbore penetrating the subterranean formation. The well treatment composite exhibits the strength of a conventional proppant yet allows for the slow release of one or more well treatment agents into the formation and/or wellbore. In some instances, the well treatment composite may be used as the proppant per se.

The well treatment composite may be used in stimulation treatments as a component of a fracturing fluid or acidizing fluid, such as a matrix acidizing fluid. The composite has particular applicability in completion fluids containing zinc bromide, calcium bromide calcium chloride and sodium bromide brines. Such fluids may be introduced down the annulus of the well and, when desired, flushed with produced water.

The well treatment composite has a nano-sized calcined porous substrate (adsorbent) of high surface area onto which is applied the well treatment agent. When used in an oil, gas or geothermal well or a subterranean formation penetrated by such a well, the well treatment agent is slowly released from the adsorbent and may be slowly released into a proppant pack.

Suitable substrates are calcined metal oxides and include alumina, zirconium oxide and titanium oxide.

In a particularly preferred embodiment, the composites of the invention are used in wells in order inhibit the formation of scales, control the formation of scales or retard the release of scale inhibitors into the well. For instance, the composite may be used in completion or production services. The composites of the invention may be used in the well to remove undesired contaminants from or control the formation of undesired contaminants onto tubular surface equipment within the wellbore.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1A:
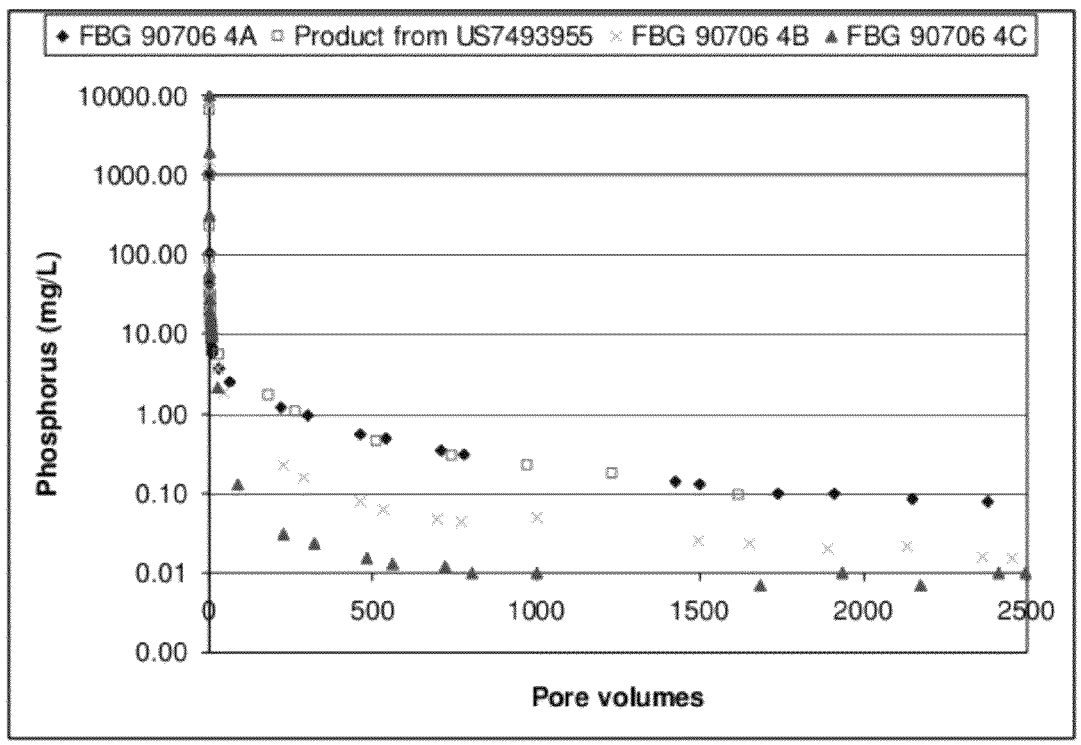
FIG. 1A and FIG. 1B are release profiles of a scale inhibitor in a high strength composites containing porous alumina adsorbents between 0 to 2,500 pore volumes and 0 to 10,000 pore volumes, respectively.

The well treatment composite for use in the treatment of wells or a subterranean formation is characterized by a calcined porous substrate prepared from nano-sized material onto which may be adsorbed at least one well treatment agent.

The porosity and permeability of the calcined porous substrate is such that the well treatment agent may also be absorbed into the interstitial spaces of the porous substrate. Typically, the surface area of the calcined porous substrate is between from about 1 m²/g to about 10 m²/g, preferably between from about 1.5 m²/g to about 4 m²/g, the diameter of the calcined porous substrate is between from about 0.1 to about 3 mm, preferably between from about 150 to about 1780 micrometers, and the pore volume of the calcined porous substrate is between from about 0.01 to about 0.10 cc/g.

The well treatment agent is generally capable of being dissolved at a generally constant rate over an extended period of time in the aqueous fluid water or hydrocarbon liquid contained in the subterranean formation.

Typically, the specific gravity of the well treatment composite is less than or equal to 3.75 g/cc.

The porous metal oxide is typically spherical and insoluble in well fluids under subterranean conditions, such as at temperatures less than about 250° C. and pressures less than about 80 MPa.

The porous substrate may be a metal oxide, such as alumina, zirconium oxide and titanium oxide. Typically, the porous substrate is alumina.

The adsorbent may be prepared by:

(a) mixing a metal oxide hydrosol (such as aluminum oxide hydrosol) containing a hydrate of the metal oxide or activated metal (such as activated alumina) and an additive component selected from carbon (such as carbon black) or a high molecular weight natural organic material (such as wood flour and starch) which is insoluble in aqueous solution up to a temperature of 50° C. and carbon with a solution of hydrolyzable base to form a mixture;

(b) introducing the mixture in dispersed form into a water-immiscible liquid having a temperature of from about 60° to 100° C., whereby gel particles are formed;

(c) aging the gel particles in the liquid at the temperature and subsequently in an aqueous base, such as an aqueous ammonia solution;

(d) recovering the aged particles; and then (e) calcining the recovered particles. During calcination, the additive component is removed. The calcined particles have a lower bulk density when the additive component is present during calcinations than when the additive component is not present. Typically, the bulk density of the well treatment composite is between from about 75 to about 150 lb/ft³. In addition, combustion of the additive component during calcinations of the hydrosol results in formation of pores of the calcined metal oxide.

The metal oxide hydrosol may optionally contain a silica-containing substance which in their non-soluble form is coprecipitated with the metal oxide particles. The silica-containing substance is preferably a low density silica, such as that prepared by hydrolysis of silicon tetrachloride in an oxyhydrogen flame and known under the designation pyrogenic silica.

In an embodiment, spherical metal oxide adsorbent may be prepared from a concentrated metal oxide hydrosol of a pH value in the range of about 3 to about 5 which, in turn, is prepared by dissolving metal in hydrochloric acid and/or metal chloride in aqueous solution or by dissolving metal hydroxychloride in water, the concentration of which is adjusted so that metal oxide derived from the sol amounts to 15 to 35% by weight, preferably to 20 to 30% by weight of the mass of the calcined particles. Metal oxide hydrate and/or activated metal, preferably of an average particle diameter of maximally 10μ, is then added to the hydrosol in an amount so that the metal oxide content amounts to 65 to 85% by weight, preferably 70 to 80% by weight of the calcined particles. Optionally, pyrogenic silica may be added to the hydrosol such that the $SiO_2$ content of the calcined particles amounts to 10 to 40% by weight. A soft to medium-hard wood flour may then added to the mixture, the wood flour being ground to a finer particle size such that it is present in a quantity of 5 to 35% by weight, preferably 10 to 25% by weight relative to the mass of the calcined particles. The hydrosol containing the wood flour may then be mixed with a concentrated aqueous solution of hexamethylene tetramine and then sprayed or dropped into a column filled with the mineral oil of a temperature of 60° C. to 100° C. The gel particles are then allowed to remain at the temperature of precipitation for a period of time from 4 to 16 hours; thereafter the gel particles are aged for 2 to 8 hours in aqueous ammonia solution, washed with water, dried at 100° C. to 150° C., or preferably at from about 120° C. to about 200° C., preheated to 250° C. to 400° C. and calcined at a temperature of 600° C. to about 1000° C.

Alternative methods for making metal oxide adsorbent are further disclosed in U.S. Pat. No. 4,013,587, herein incorporated by reference.

In a preferred embodiment, when the metal oxide adsorbent is alumina adsorbent, the adsorbent may be prepared by hydrolyzing aluminum alkoxides to render nano sized alumina, drying to remove water and then introducing the dried aluminum in a dispersed form into an oil at a temperature of from about 60° to 100° C., whereby gel particles are formed. The gel particles are then aged in the liquid and subsequently in an aqueous ammonia solution, recovered and then calcined. Nano sized alumina may be produced having an average diameter in the range from about 0.4 mm to about 1 mm.

The amount of well treatment agent in the composite is normally from about 1 to 50 weight percent, preferably from about 14 to about 40 weight percent.

The well treatment agent is preferably water soluble or soluble in aliphatic and aromatic hydrocarbons. When fluid is produced, the well treatment agent may desorb into its respective solubilizing liquid. For instance, where a solid well treatment is an inhibitor for scales, corrosion, salts or biocidal action, the treatment agent may desorb into produced water. In the absence of water flow, the well treatment agent may remain intact on the solid adsorbent. As another example, solid inhibitors for paraffin or asphaltene may desorb into the hydrocarbon phase of produced fluid.

In a preferred embodiment, the well treatment agent may be at least one member selected from the group consisting of demulsifying agents (both water-in-oil and oil-in-water), corrosion inhibitors, scale inhibitors, paraffin inhibitors, gas hydrate inhibitors, salt formation inhibitors and asphaltene dispersants as well as mixtures thereof.

Further, other suitable treatment agents include foaming agents, oxygen scavengers, biocides and surfactants as well as other agents wherein slow release into the production well is desired.

Adsorption of the well treatment agent onto the adsorbent reduces (or eliminates) the amount of well treatment agent required to be in solution. Since the well treatment agent is adsorbed onto a substrate, only a small amount of well treatment agent may be released into the aqueous medium.

The well treatment agent is preferably a liquid material. If the well treatment agent is a solid, it can be dissolved in a suitable solvent, thus making it a liquid.

The composites defined herein are used in well treatment compositions such as fluids used for the treatment of gas wells or oils wells wherein it is desired to inhibit the formation of undesired contaminants, control the formation of undesired contaminants or retard the release of undesired contaminants into the well. For instance, the composite may be used in completion or production services. The composites of the invention may be used in the well to remove undesired contaminants from or control the formation of undesired contaminates onto tubular surface equipment within the wellbore.

In a preferred embodiment, the well treatment composite of the invention effectively inhibits, controls, prevents or treats the formation of inorganic scale formations being deposited in subterranean formations, such as wellbores, oil wells, gas wells, water wells and geothermal wells. The composites of the invention are particularly efficacious in the treatment of scales of calcium, barium, magnesium salts and the like, including barium sulfate, calcium sulfate, and calcium carbonate scales. The composites may further have applicability in the treatment of other inorganic scales, such as zinc sulfide, iron sulfide, etc.

The well treatment composite may also be used to control and/or prevent the undesired formation of salts, paraffins, gas hydrates, asphaltenes as well as corrosion in formations or on surface equipment. Further, other suitable treatment agents include foaming agents, oxygen scavengers, biocides, emulsifiers (both water-in-oil and oil-in-water) and surfactants as well as other agents may be employed with the adsorbent when it is desired to slowly slow release such agents into the production well.

Suitable scale inhibitors are anionic scale inhibitors.

Preferred scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Further useful, especially for brines, are chelating agents, including diethylenetriaminepentamethylene phosphonic acid and ethylenediaminetetra acetic acid.

The well treatment agent may further be any of the fructans or fructan derivatives, such as inulin and inulin derivatives, as disclosed in U.S. Patent Publication No. 2009/0325825, herein incorporated by reference.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Paraffin inhibitors useful for the practice of the present invention include, but are not limited to, ethylene/vinyl acetate copolymers, acrylates (such as polyacrylate esters and methacrylate esters of fatty alcohols), and olefin/maleic esters.

Exemplary corrosion inhibitors useful for the practice of the invention include but are not limited to fatty imidazolines, alkyl pyridines, alkyl pyridine quaternaries, fatty amine quaternaries and phosphate salts of fatty imidazolines.

Gas hydrate treating chemicals or inhibitors that are useful for the practice of the present invention include but are not limited to polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary asphaltene treating chemicals include but are not limited to fatty ester homopolymers and copolymers (such as fatty esters of acrylic and methacrylic acid polymers and copolymers) and sorbitan monooleate.

Suitable foaming agents include, but are not limited to, oxyalkylated sulfates or ethoxylated alcohol sulfates, or mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

The composite of the invention does not require excessive amounts of well treatment agents. The amount of well treatment agent in the composite is that amount sufficient to effectuate the desired result over a sustained period of time and may be as low as 1 ppm. Generally, the amount of well treatment agent in the composite is from about 0.05 to about 5 (preferably from about 0.1 to about 2) weight percent based upon the total weight of the composite.

When placed into a well, the well treatment agent slowly dissolves at a generally constant rate over an extended period of time in the water or hydrocarbons which are contained in the formation and/or well. The composite therefore permits a continuous supply of the well treatment agent into the targeted area. Generally, the lifetime of a single treatment using the composite of the invention is between six and twelve months and may be in excess of 3 years depending upon the volume of water or hydrocarbons produced in the production well and the amount of well treatment agent bound to the calcined porous metal oxide.

Adsorption of the well treatment agent onto the porous metal oxide and into the interstitial spaces of the oxide reduces (or eliminates) the amount of well treatment agent required to be in solution. In light of the physical interaction between the well treatment agent and porous metal oxide, only a small amount of well treatment agent may be released into the aqueous or hydrocarbon medium.

For instance, where the well treatment agent is a scale inhibitor, the amount of scale inhibitor released from the composite is that amount required to prevent, or to at least substantially reduce the degree of, scale formation. For most applications, the amount of scale inhibitor released from the well treatment composite may be as low as 0.1 ppm. Costs of operation are therefore significantly lowered.

As the oilfield fluid passes through or circulates around the well treatment composites, the well treatment agent slowly desorbs. In so doing, the composites are characterized by time-release capabilities. Gradual desorption of the well treatment agents insures that they are available to produced fluids for extended periods of time, typically extending for periods of time greater than a year and even as long as five years. Typically the resulting concentration of the well treatment agent in the wellbore is between from about 1 to about 50 ppm and may be as low as 1 ppm. Such small amounts of well treatment agent may be sufficient for up to 1,000 pore volumes.

The composites of the invention may be employed with carrier or treatment fluids in order to facilitate placement of the composite to a desired location within the formation. In this regard, any carrier fluid suitable for transporting the composite may be used. Well treatment compositions containing the composite may be gelled or non-gelled. In one embodiment, the well treatment composites described herein may be introduced or pumped into a well as neutrally buoyant particles in, for example, a saturated sodium chloride solution carrier fluid or a carrier fluid that is any other completion or workover brine known in the art. Suitable carrier fluids include or may be used in combination with fluids have gelling agents, cross-linking agents, gel breakers, surfactants, foaming agents, demulsifiers, buffers, clay stabilizers, acids, or mixtures thereof.

The carrier fluid may be a brine (such as a saturated potassium chloride or sodium chloride solution), salt water, fresh water, a liquid hydrocarbon, or a gas such as nitrogen or carbon dioxide. The amount of composite present in the well treating composition is typically between from about 15 ppm to about 100,000 ppm depending upon the severity of the scale deposition. Suitable compositions include fracturing fluids, completion fluids, acidizing compositions, etc.

Well treatment compositions containing the composites may be used in treatment operations near the wellbore in nature (affecting near wellbore regions) and may be directed toward improving wellbore productivity and/or controlling the production of fracture proppant or formation sand. Particular examples include gravel packing and, frac-packs and water packs. Moreover, such particles may be employed alone as a fracture proppant/sand control particulate, or in mixtures in amounts and with types of fracture proppant/sand control materials, such as conventional fracture or sand control particulates. In such applications, the composite may be used in conjunction with a proppant or sand control particulate.

Such proppants or sand control particulates may be a conventional particulate material employed in hydraulic fracturing or sand control operations, e.g., sand ((having an apparent specific gravity (ASG), API RP 60, of 2.65)) or bauxite (having an ASG of 3.55). Alternatively, the proppant or sand control particulate may be "relatively lightweight", defined as a particulate that has an ASG (API RP 56) that is less than about 2.45, more preferably less than or equal to 2.0, even more preferably less than or equal to 1.75, most preferably less than or equal to 1.25. Such different types of particulates may be selected, for example, to achieve a blend of different specific gravities or densities relative to the selected carrier fluid. For example, a blend of three different particles may be selected for use in a water fracture treatment to form a blend of well treatment particulates having three different specific gravities, such as an ASG of the first type of particle from about 1 to less about 1.5; an ASG of the second type of particle from greater than about 1.5 to about 2.0; and ASG of the third type of particle from about greater than about 2.0 to about 3.0; or in one specific embodiment the three types of particles having respective specific gravities of about 2.65, about 1.7 and about 1.2. In one example, at least one of the types of selected well treatment particulates may be selected to be substantially neutrally buoyant in the selected carrier or treatment fluid.

In some instances, the well treatment composition may contain between from about 1 to about 99% by weight of proppant.

In other instances, the composite defined herein is sufficiently strong at high pressures to be used as a proppant in hydraulic fracturing operations including temperatures in excess of 250° C. and pressures in excess of 80 MPa.

For example, when used in hydraulic fracturing and/or sand control treatments, the porous particulate may be selected so to exhibit crush resistance under conditions as high as 10,000 psi closure stress, API RP 56 or API RP 60, generally between from about 250 to about 8,000 psi closure stress.

The composites of the invention are particularly effective in hydraulic fracturing as well as sand control fluids such as water, salt brine, slickwater such as slick water fracture treatments at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

When used in hydraulic fracturing, the composite may be injected into a subterranean formation in conjunction with a hydraulic fracturing fluid at pressures sufficiently high enough to cause the formation or enlargement of fractures. Since the particulates may withstand temperatures greater than about 370° C. and closure stresses greater than about 8000 psi, they may be employed as the proppant particulate.

Alternatively, the composite may be employed in conjunction with a conventional proppant. Since the porous particulate of the composite is insoluble, the composite may continue to function as a proppant even after the well treatment agent has been completely leached out of the composite.

Fluids containing the well treatment composites may be used to optimize hydraulic fracture geometries and enhance well productivity. As an example, the fluids may be used to achieve increased propped fracture length in relatively tight gas formations. Choice of different particulate materials and amounts thereof to employ in such blends may be made based on one or more well treatment considerations including, but not limited to, objective/s of well treatment, such as for sand control and/or for creation of propped fractures, well treatment fluid characteristics, such as apparent specific gravity and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and/or sand control pack conductivity and combinations thereof. The fracturing fluid, to be used with the composite, exhibits high viscosity, so as to be capable of carrying effective volumes of one or more proppants. It may include aqueous gels and hydrocarbon gels.

The composite may further be advantageously employed in liquefied gas and foamed gas carrier fluids, such as liquid $CO_2$, $CO_2/N_2$, and foamed $N_2$ in $CO_2$ based systems. In this regard, liquid $CO_2$ based fracturing job characteristics, such as proppant amounts, proppant sizes, mixing and pumping methodologies, using relatively lightweight porous ceramic materials may be the same as employed for conventional proppants.

Further, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the composite and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the composite; the balance of the slurry may be another material, such as a conventional gravel pack particulate.

As an alternative to use of a screen, the composite may be used in any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The composite is typically sufficiently strong to be used as a proppant during a hydraulic fracturing operation at high pressures. They may further be used in conjunction with other well treatment agents including non-porous proppant materials, such as sand.

When used in fracturing, the fluid may or may not contain a proppant.

In another embodiment, the calcined porous metal oxide of the composite may be reactivated or recharged with the well treatment agent after at least a portion of the well treatment agent has been depleted. Such processes are disclosed in U.S. Pat. No. 7,686,081 and U.S. Patent Publication no. 2010/0175875, both of which are herein incorporated by reference.

In this procedure, an initial charge of the composite may be injected into the well bore in a conventional method, whether for fracturing or for gravel packing. Such conventional methods include truck treating, continuous injection, or high pressure pumping, for example. The downhole matrix formed within the formation after the initial charge is comprised of the well treatment agent on a water-insoluble adsorbent as part of the sand matrix.

For gravel packing in a sand control method, the composite is placed adjacent to a subterranean formation to form a fluid-permeable matrix capable of reducing or substantially preventing the passage of formation particles from the subterranean formation into the well bore while at the same time allowing passage of formation fluids from the subterranean formation into the well bore.

When a screening device is employed, the screening device is placed in the wellbore before the injection of the composite. The mixture is injected such that it is packed around the exterior of the screening device to provide a fluid-permeable matrix around the screening device which is capable of reducing or substantially preventing the passage of formation particles from the subterranean formation into the wellbore while at the same time allowing passage of formation fluids from the subterranean formation into the wellbore. In addition, the screen itself can be packed with the well treatment composite.

Additional amount fluid containing the well treatment agent may be injected into the formation anytime after the initial charge of well treatment agent in the composite has at least partially depleted. Typically, the additional well treatment agent is introduced when the well treatment agent adsorbed onto the adsorbent or within the interstitial spaces of the composite has been substantially depleted and the performance level of the well treatment agent in the composite has become unacceptable.

The injection of additional well treatment agent may be carried out in the same manner by which the initial composite was charged into the wellbore, and can be carried out in any conventional method of injecting fluids into a wellbore of an oil or gas well, as mentioned above. The fluid which is injected will typically be comprised of the desired well treatment agent(s) in a solution which further comprises a solvent. The relative amounts of the solvent and treatment agent of the solution to be injected into the wellbore will of course vary depending upon the agent and solvent involved, but will typically be of a solvent to treatment agent ratio in the range of about 10:90 to about 95:5, by weight. The solvent in one embodiment is xylene, toluene, or a heavy aromatic distillate or a mixture thereof. When a mixture of all of xylene, toluene and heavy aromatic distillate is used, the relative amounts of each solvent component can vary, but will be typically in variable weight ratios (xylene:toluene:heavy aromatic distillate) such as 10:70:20, 20:70:10, 70:20:10 or 20:10:70. In another embodiment, the solvent can be water (for water soluble well treatment agents).

After the injection step is carried out, the wellbore is pressurized for a time and under conditions sufficient to reactivate the downhole matrix in the formation. This pressurization of material in the wellbore and formation fracture is commonly referred to as a "squeeze." Reactivation of the treatment agent downhole may occur through the squeeze process as long as the activity of the treatment agent in the in-place matrix is increased relative to the treatment agent activity of the matrix just prior to injecting the solution. The determination of whether the treatment agent activity has increased relative to the activity of that agent just prior to injection of the solution and completion of the squeeze may be made through conventional residual analysis and comparison of the same before and after the squeeze, and conventional analysis of the physical well parameters, e.g., the production rate of the well and well pressure.

The pressure to which the wellbore is pressurized in the squeeze process typically will be a pressure below the fracturing pressure, and when applicable, below the pressure that would cause the gravel pack to break up. In one embodiment of the invention, the pressure is in a range of about 500 to about 15000 psia. The duration for which the pressure condition is applied to the well will vary, depending upon the ease of fracturing, but will typically be in the range of about 2 to about 10 hours.

In another embodiment, the well treatment composite may be used to pre-pack a screen for use in gravel packed wells. In this embodiment, the composite is preferably placed as close to the point of equilibrium as possible in order to ensure the continuous release of the well treatment agent throughout the producing flow stream. In this manner, the well treatment composite may be used as a preventative measure by stopping precipitation and deposition of the well treatment agent before it starts. Such alternatives are desired, for instance, when there is a need to increase the amount of the solid well treatment agent that can be placed in gravel packed wells there the amount of proppant or gravel placed in the well is at a minimum. In addition, the well treatment composites in prepacked screens may be used to increase the amount of solid substrate exposed during sand control. When used in sand control, screens prepacked with the well treatment composite may reduce intervention costs for remediation and further increases the effectiveness of the operation. Preferably, however, the screen used is of a size to reduce plugging by formation fines migration.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

In accordance with the procedure set forth in U.S. Pat. No. 4,013,587, alumina spheres were prepared by hydrolyzing aluminum alkoxide. The resulting spheres were then dried to remove the water. The dried aluminum was then dispersed into an oil at about 90° C. Gel particles were formed.

Water insoluble spherical particles of greater than 95% alumina were recovered as Sample A. The spherical alumina beads consisted of bohemite alumina (non calcined) having a 1 mm diameter, a pore volume of 0.5 cc/g and a surface area of 216 m2/g.

A portion of Sample A was calcined at 1200° C. for 2 hours to render spherical beads of 1 mm diameter (Sample B) composed of alpha/delta theta alumina and having a pore volume of 0.08 cc/g and a surface area of 3 $m^2/g$.

A portion of Sample A was calcined at 1400° C. for 2 hours to render spherical beads of 1 mm diameter (Sample C) composed of alpha alumina and having a pore volume of 0.03 cc/g and a surface area of 4 $m^2/g$.

Example 2

Each of Sample A, Sample B and Sample C were added at different weight percent loadings to commercial lightweight ceramic proppant, commercially available as CARBO LITE® from Carbo Ceramics Inc. of Dallas, Tex., and the crush was determined according to ISO13503-2: Measurement of Properties of Proppants used in Hydraulic Fracturing and Gravel Packing Operations) The results are shown in Table I below wherein the Comparative Sample is a 10/50 mesh diatomaceous earth (Celite MP-79):

TABLE I

| STRESS, psi | CONCEN-TRATION | Comparative Sample CRUSH % | Sample A CRUSH % | Sample B CRUSH % | Sample C CRUSH % |
|---|---|---|---|---|---|
| 4 | 0% | 0.24 | 0.15 | 0.15 | 0.15 |
| 0 | 2% | NA | 0.68 | 0.36 | 0.32 |
| 0 | 4% | NA | 0.83 | 0.24 | 0.34 |
| 0 | 10% | 5.88 | 3.16 | 0.61 | 0.39 |
| 6 | 0% | 0.92 | 0.92 | 0.92 | 0.92 |
| 0 | 2% | 2.77 | 2.09 | 1.09 | 1.09 |
| 0 | 4% | 5.08 | 4.18 | 1.09 | 0.90 |
| 0 | 10% | 11.49 | 9.57 | 1.48 | 1.46 |
| 8 | 0% | 5.29 | 5.44 | 5.44 | 5.44 |
| 0 | 2% | 7.14 | 8.38 | 6.22 | 5.61 |
| 0 | 4% | 10.23 | 9.72 | 5.15 | 5.15 |
| 0 | 10% | 17.21 | 17.30 | 5.44 | 5.03 |
| 10 | 0% | NA | 12.32 | 12.32 | 12.32 |
| 0 | 2% | NA | 17.38 | 11.25 | 12.20 |
| 0 | 4% | NA | 22.31 | 14.12 | 9.96 |
| 0 | 10% | NA | 24.98 | 12.56 | 11.45 |

The results indicate that the non-calcined Sample A has strength comparable to the diatomaceous earth of the Comparative Sample, whereas calcined Sample B and Sample C had the strength of commercial ceramic proppant in that even after the addition of 10% by weight of Sample B or Sample C the crush strength of the combined proppant particle mixtures, even at 10,000 psi stress, was not altered.

Example 3

Scale inhibitor amino tri(methylene phosphonic acid) (ATMP), commercially available as Dequest 2000 from ThermPhos International BV was adsorbed onto each of Sample A, Sample B and Sample C to render Samples FBG-90706-4A, FBG-90706-4B and FBG-90706-4C respectively. These Samples were prepared by first adsorbing water on the Samples to determine how much water could be adsorbed. Water was added to the sample until the Sample appeared wet.

Sample A was found to adsorb 0.698 g of $H_2O$/g of sample, Sample B adsorbed 0.362 g of $H_2O$/g of sample, and Sample C adsorbed 0.415 g of $H_2O$/g of sample. Next Dequest 2000 was added to each sample. Due to the low absorbency compared to diatomaceous earth, two additions were followed to prepare the samples. In the first addition for Sample A, only 0.32 g of Dequest 2000/g of Sample A could be added. In the second addition, 0.25 g of Dequest 2000/g of Sample A could be added. This results in a product which contains about 22% active content. The method used to prepare the diatomaceous earth based product set forth in U.S. Pat. No. 7,493,955 was adapted to these alumina samples. For Sample B, only 0.31 g of Dequest 2000/g of Sample B could be added followed by 0.13 g of Dequest 2000/g of Sample B in the second addition. This results in a product which contains about 18% active content. For Sample C, only 0.23 g of Dequest 2000/g of Sample C could be added followed by 0.08 g of Dequest 2000/g of Sample C in the second addition. This results in a product which contains about 13.5% active content. The properties of each of these samples is set forth in Table II below:

TABLE II

| Product | | FBG 90607-4A | FBG 90607-4B | FBG 90607-4C |
|---|---|---|---|---|
| Alumina | | Sample A | Sample B | Sample C |
| Nominal Content | % by weight | 22 | 18 | 13.5 |
| Determined Content | | 19.6 | 15.5 | 12.0 |
| Bulk Loose | lb/ft$^3$ | 36 | 81 | 97 |
| Density Packed | | 43 | 90 | 105 |
| Specific gravity | $H_2O$ = 1 | 4.22 | 3.50 | 3.43 |
| pH | 10% Slurry | 2.16 | 1.65 | 1.76 |

Example 4

Figure 1B:
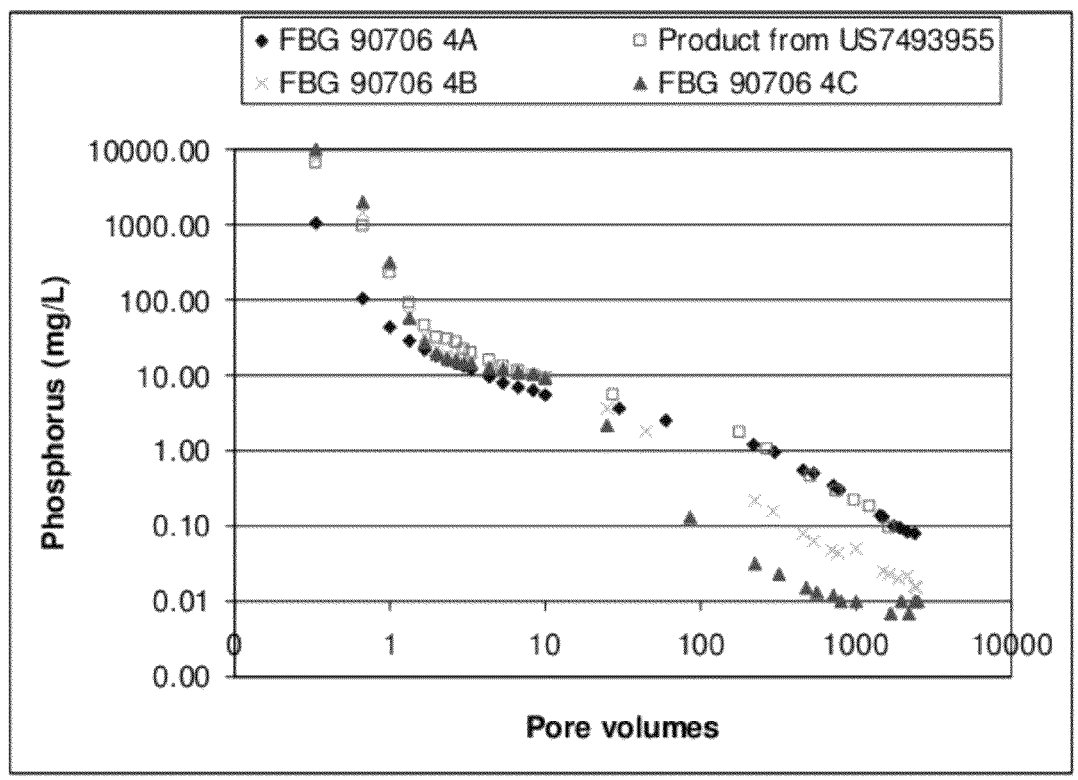

The elution characteristic of the solid composites of Example 3 were determined by packing 20/40-mesh Ottawa sand and solid inhibitor (2% by weight of the sand) into a 35-cm-long stainless steel column (inner diameter=1.08 cm). The pore volume was approximately 12 mL. The column was eluted with synthetic brine (0.025 mol/L $CaCl_2$, 0.015 mol/L $NaHCO_3$, 1 mol/L NaCl, sparged with 100% $CO_2$) at 60° C. with a flow rate of 120 mL/hour. The synthetic brine was at saturation with calcite to simulate typical connate brine in the formation. The effluent solution was collected and analyzed for phosphorus and Ca concentration to obtain the inhibitor release profile. The results are shown in FIG. 1A and FIG. 1B. The minimum effective concentration for scale inhibition was 0.1 ppm.

Example 5

Five alumina samples labeled 23A, 23B, 23C, 23D and 23E were prepared. 23-A was the same as Sample A (1 mm alumina bead, not calcined); 23-B was the same as Sample B (1 mm alumina beads calcined at 1200° C. for 2 hours) and 23-C was the same as Sample C (1 mm alumina bead calcined at 1400° C. for 2 hours). Samples 23D and 23E were prepared using the same protocols as Sample B and Sample C, respectively, except the diameter of the spherical beads was adjusted to 0.8 mm. Each of 23A, 23B, 23C, 23D and 23E were heated to 225° F. and cooled to room temperature in a desiccator before the addition of the ATMP solution. A 55% by weight solution of ATMP was prepared. Three additions were made to each sample and the amount that was able to be adsorbed is set forth in Table III below:

TABLE III

| Alumina | g Alumina | g 1$^{st}$ Addition | g 2$^{nd}$ Addition | g 3$^{rd}$ Addition | % ATMP by weight sample |
|---|---|---|---|---|---|
| 23A | 50.001 | 3.00 | 3.25 | 0.84 | 7.2 |
| 23B | 50.005 | 9.43 | 6.52 | 1.34 | 16.0 |
| 23C | 50.004 | 5.29 | 1.83 | 0.70 | 7.9 |
| 23D | 50.008 | 9.81 | 9.10 | 3.98 | 20.1 |
| 23E | 50.006 | 9.93 | 3.80 | 2.02 | 14.8 |

The results shown in Table III are in contrast to 22.1% for Sample A, 18.1% for Sample B and 13.5% for Sample C.

Example 6

Figure 2:
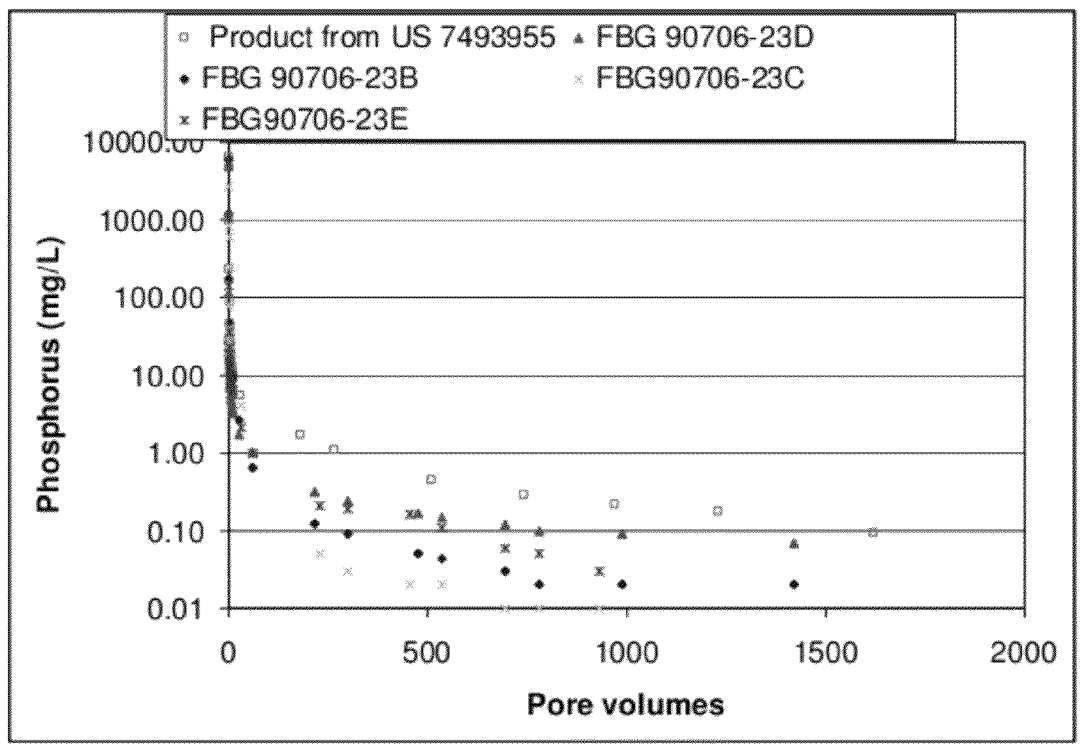
FIG. 2 is a release profile of a scale inhibitor in high strength composites containing porous alumina adsorbent of varying diameter between 0 to 2,000 pore volumes.
Figure 3:
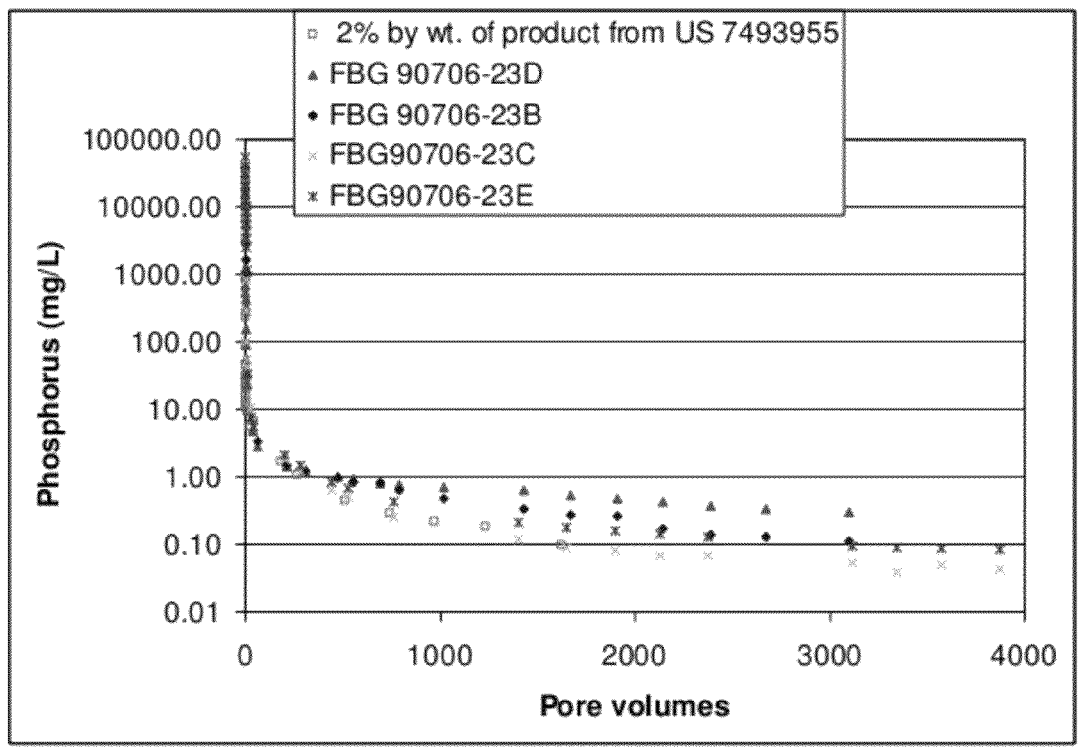
FIG. 3 is a release profile of a scale inhibitor in high strength composites containing porous alumina adsorbent of varying diameter using a sand pack using 50% of the particles as in FIG. 2.

The elution of Samples 22B, 23C, 23D, 23E and the Comparative Sample of Example 2 were performed as set forth by the method in Example 4 with 2% of the particles by weight of the sand in the column. The results are shown in FIG. 2. The results are similar to those illustrated in FIG. 1A and FIG. 1B. Since there is commercial interest in using higher percentage of the particles in a proppant pack, the elution studies were performed on the samples at 50% of the particles in the sand pack and the results are shown in FIG. 3. FIG. 3 indicates much slower release and longer period of effective inhibition.

Example 7

Four samples were prepared of two different sizes (0.8 mm and 1.0 mm diameter before calcining) in accordance with the procedure set forth in Example 1. The four samples were labeled as CO10118 (0.8 mm), CO10118 (1 mm), CO10524 (0.8 mm) and CO10593 (1 mm). Sample CO10118, after calcining, had a size of 25 mesh (0.71 mm) and a surface area of 1 m$^2$/g; sample CO10118, after calcining, had a size of 30 mesh (0.59 mm) and a surface area of less than 1 m$^2$/g. Sample CO10524, after calcining, had a size of 30 mesh (0.59 mm) and a surface area of 5.6 m$^2$/g and sample CO10593, after calcining, had a size of 20 mesh (0.84 mm) and a surface area of 7.3 m$^2$/g. Crush analysis was conducted on each of the samples as well as on ECONOPROP®, a commercial proppant available from Carbo Ceramics Inc. Further, two other samples labeled 25 mesh APA1.0/3C 12853 (surface area 3.1 m$^2$/g) and 30 mesh APA0.8/3C 12852 were also prepared. The crush data on these is presented also in Table 4. The crush data of each sample was generated using a pluviation method to load the proppant in the API crush cell. The results are shown in Table IV below:

TABLE IV

| | Crushed Fines % | | | |
|---|---|---|---|---|
| Sample | 5000 psi | 6000 psi | 8000 psi | 10000 psi |
| 25 Mesh 0.8 mm C010118 (Surface Area: 1 m$^2$/g) | 0.5 | 0.8 | 1.9 | 8.4 |
| 30 Mesh 1.0 mm C010118 (Surface Area: <1 m$^2$/g) | 5.2 | 5.9 | 11.8 | 18.9 |
| 30 Mesh 0.8 mm C010524 (Surface Area: 5.6 m$^2$/g) | 9.0 | 12.1 | 24.6 | 37.6 |
| 20 Mesh 1.0 mm C010593 (Surface Area: 7.3 m$^2$/g) | 26.6 | 36.5 | 49.2 | 61.4 |
| 25 Mesh EconoProp | NA | NA | 21.5 | 24.9 |
| 30 Mesh EconoProp | 11.1 | 12.2 | 15.0 | 20.6 |

TABLE IV-continued

| | Crushed Fines % | | | |
|---|---|---|---|---|
| Sample | 5000 psi | 6000 psi | 8000 psi | 10000 psi |
| 25 Mesh APA 1.0/3 C12853 (Surface Area: 3.1 m²/g) | 1.2 | 2.2 | 8.6 | 17.5 |
| 30 Mesh APA 0.8/3 C12852 (Surface Area: 3.1 m²/g) | 0.7 | 1.5 | 4.4 | 11.6 |
| 25 Mesh EconoProp | NA | NA | 21.4 | 26.0 |
| 30 Mesh EconoProp | 4.9 | 5.3 | 10.1 | 14.7 |

Example 8

Scale Inhibitor amino tri(methylene phosphonic acid) (ATMP), commercially available as Dequest 2000 from ThermPhos International BV was adsorbed onto the four samples of Example 7 and resultant materials were labeled FBG-100824A, FBG-100824B, FBG-100824C and FBG-100824D, respectively. The procedure for the preparation of these samples is set forth above in Example 3. The properties for each of the samples is set forth in Table V below:

TABLE V

| Sample | | FBG 100824 A | FBG 100824 B | FBG 100824 C | FBG 100824 D |
|---|---|---|---|---|---|
| Alumina | | CO10118, 0.8 mm | CO10524, 0.8 mm | CO10593, 1 mm | CO10118, 1 mm |
| Calculated Content | ATMP % by weight | 17.7 | 38.5 | 40.5 | 26.2 |
| Determined Content | | 9.7 | 16.7 | 20.6 | 13.2 |
| Bulk Loose Density Packed | lb/ft³ | 106 114 | 88 94 | 87 94 | 100 108 |
| Specific gravity | $H_2O = 1$ | 3.19 | 2.94 | 2.87 | 3.11 |
| Moisture | % by weight | 0.41 | 0.50 | 0.51 | 0.48 |

Example 9

Figure 4A:
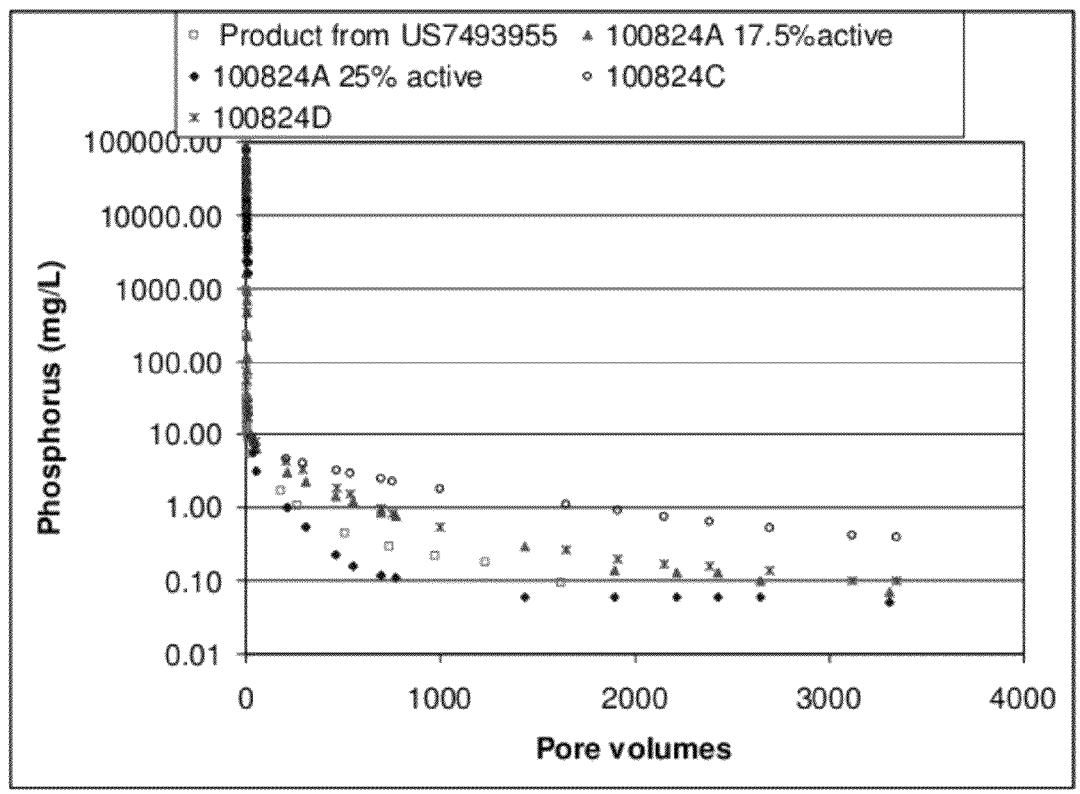
FIG. 4A and FIG. 4B are release profiles of a scale inhibitor in high strength composites containing porous alumina adsorbents of varying diameters and sizes between 0 to 4,000 pore volumes and 0 to 10,000 pore volumes, respectively.
Figure 4B:
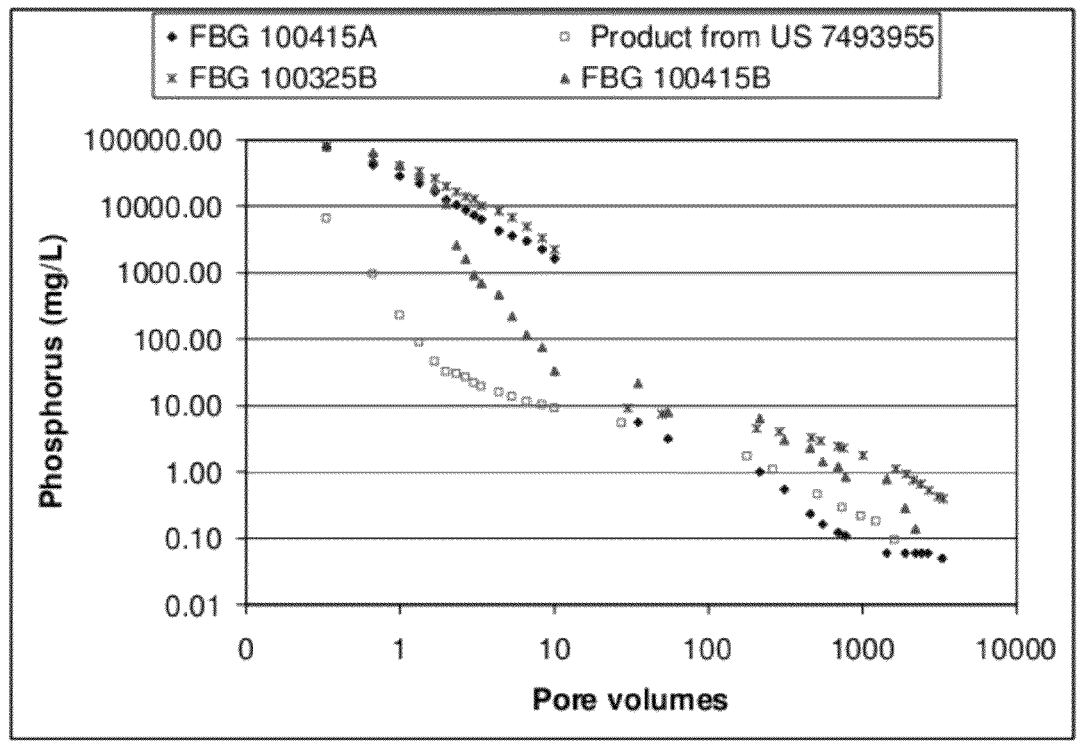

The elution of each of samples of Example 8 was performed in accordance with the procedures set forth in Examples 4 and 6 with 50% of the particles by weight of the sand in the column. The results are set forth in FIG. 4A and FIG. 4B and are compared to the results of 2% of loading of the composite exemplified in U.S. Pat. No. 7,493,955. The results are similar to those of Example 6 and show that the amount of composite may be tailored with the amount of proppant depending on the amount of water produced from the well and how long protection is desired. As illustrated, 2% of the particles in the sand and 50% particles in the sand may be used for the same purpose.

From the foregoing, it will be observed that numerous variations and modifications may be effected without departing from the true spirit and scope of the novel concepts of the invention.

What is claimed is:

1. A well treatment composite comprising a well treatment agent and calcined porous metal oxide wherein the porosity and permeability of the calcined porous metal oxide is such that the well treatment agent is adsorbed onto the calcined porous metal oxide or absorbed into the interstitial spaces of the porous metal oxide and further wherein:
   (a) the surface area of the calcined porous metal oxide is between from about 1 m²/g to about 10 m²/g;
   (b) the diameter of the calcined porous metal oxide is between from about 0.1 to about 3 mm; and
   (c) the pore volume of the calcined porous metal oxide is between from about 0.01 to about 0.10 cc/g.

2. The well treatment composite of claim 1, wherein the composite contains between from about 1 to about 50 weight percent of the well treatment agent.

3. The well treatment composite of claim 1, wherein the porous metal oxide constitutes an adsorbent for the well treatment agent and wherein the adsorbent further contains silica.

4. The well treatment composite of claim 1, wherein the well treatment agent is selected from the group consisting of scale inhibitors, corrosion inhibitors, paraffin inhibitors, salt inhibitors, gas hydrate inhibitors, asphaltene inhibitors, oxygen scavengers, biocides, foaming agent, emulsion breakers and surfactants and mixtures thereof.

5. The method of claim 4, wherein the well treatment agent is a scale inhibitor, corrosion inhibitor, paraffin inhibitor, salt inhibitor, gas hydrate inhibitor, asphaltene inhibitor or mixture thereof.

6. The well treatment composite of claim 5, wherein the calcined porous metal oxide is alumina.

7. The well treatment composite of claim 1, wherein the porous metal oxide is alumina.

8. The well treatment composite of claim 7, wherein the calcined porous alumina is alpha/delta theta alumina or alpha alumina.

9. The well treatment composite of claim 1, wherein the well treatment agent is water soluble.

10. The well treatment composite of claim 1, wherein the well treatment agent is hydrocarbon soluble.

11. A proppant comprising the well treatment composite of claim 1, wherein no greater than 15% of the proppant is crushed at closure stresses of 10,000 psi when the composite contains 10 weight percent of well treatment agent.

12. A well treatment composition comprising the well treatment composite of claim 1 and at least one proppant, wherein the well treatment composite contains between from about 1 to about 50 weight percent of the well treatment agent.

13. The well treatment composition of claim 12, wherein the porous metal oxide of the well treatment composite is alumina.

14. A well treatment composite for introduction into a subterranean formation, the well treatment composite comprising a water soluble or hydrocarbon soluble well treatment agent and calcined porous alumina wherein the porosity and permeability of the calcined porous alumina is such that the well treatment agent is adsorbed onto the surface of the calcined porous alumina or absorbed into the interstitial spaces of the calcined porous alumina and further wherein the well treatment composite contains between from about 1 to about 50 weight percent of the well treatment agent which is capable of being desorbed at a generally constant rate over an extended period of time in the formation fluid contained in the subterranean formation.

15. The well treatment composite of claim 14, wherein the alumina has been calcined at temperatures greater than or equal to 1200° C.

16. The well treatment composite of claim 15, wherein the alumina has been calcined at temperatures greater than or equal to 1400° C.

17. The well treatment composite of claim 14, wherein. the calcined porous alumina constitutes an adsorbent for the well treatment agent and wherein the adsorbent further contains silica.

18. The well treatment composite of claim 14, wherein:
  (a) the surface area of the calcined porous metal oxide is between from about 1 $m^2/g$ to about 10 $m^2/g$:
  (b) the diameter of the calcined porous metal oxide is between from about 0.1 to 3 mm;
  (c) the pore volume of the calcined porous metal oxide is between from about 0.01 to about 0.10 cc/g;
  (d) the bulk density of the composite is between from about 75 to about 150 $lb/ft^3$; and
  (e) the specific gravity of the well treatment composite is less than or equal to 3.75 g/cc.

19. A well treatment composition comprising the well treatment composite of claim 14 and a proppant.

* * * * *